United States Patent [19]

Asanuma et al.

[11] Patent Number: 5,428,121
[45] Date of Patent: Jun. 27, 1995

[54] METHOD FOR PREPARING SYNDIOTACTIC POLYPROPYLENE

[75] Inventors: Tadashi Asanuma; Tsutomu Iwatani, both of Takaishi; Ryuichi Sugimoto, Izumi; Norihide Inoue, Yokohama; Masahiro Kouno, Ashigarashimo; Tetsunosuke Shiomura, Tokyo, all of Japan

[73] Assignee: Mitsui Toatsu Chemicals, Inc., Tokyo, Japan

[21] Appl. No.: 272,868

[22] Filed: Jul. 8, 1994

Related U.S. Application Data

[63] Continuation of Ser. No. 74,162, Jun. 9, 1993, abandoned, which is a continuation of Ser. No. 679,523, Apr. 2, 1991, abandoned.

[30] Foreign Application Priority Data

Apr. 9, 1990 [JP] Japan .................................... 2-92303

[51] Int. Cl.$^6$ ........................ C08F 4/642; C08F 10/06
[52] U.S. Cl. ..................................... 526/160; 526/131; 526/134; 526/351; 526/903
[58] Field of Search ................ 526/132, 100, 134, 131

[56] References Cited

U.S. PATENT DOCUMENTS

| | | | |
|---|---|---|---|
| 4,892,851 | 1/1990 | Ewen et al. | 526/351 |
| 5,003,019 | 3/1991 | Ishimaru et al. | 526/160 |
| 5,026,798 | 6/1991 | Canich | 526/160 |
| 5,241,025 | 8/1993 | Hlatky et al. | 526/134 |

FOREIGN PATENT DOCUMENTS

| | | | |
|---|---|---|---|
| 273655 | 7/1988 | European Pat. Off. | 526/160 |
| 277003 | 8/1988 | European Pat. Off. | |
| 277004 | 8/1988 | European Pat. Off. | |
| 0283164 | 9/1988 | European Pat. Off. | |
| 0351392 | 1/1990 | European Pat. Off. | |
| 61-221206 | 10/1986 | Japan | 526/160 |

Primary Examiner—Edward J. Smith
Attorney, Agent, or Firm—Burns, Doane, Swecker & Mathis

[57] ABSTRACT

A method for preparing a propylene (co)polymer having a substantially high syndiotactic structure and a desired molecular weight which comprises the step of (co)polymerizing propylene or propylene and a small amount of another olefin by the use of a transition metal compound catalyst having asymmetric ligands in the presence of a specific internal olefin.

7 Claims, No Drawings

METHOD FOR PREPARING SYNDIOTACTIC POLYPROPYLENE

This application is a continuation of application Ser. No. 08/074,162, filed Jun. 9, 1993 now abandoned which is a continuation of application Ser. No. 07/679,523, filed Apr. 2, 1991, now abandoned.

BACKGROUND OF THE INVENTION (a) Field of the Invention

The present invention relates to a method for preparing syndiotactic polypropylene and propylene copolymers. More specifically, it relates to a method for preparing syndiotactic polypropylene and propylene copolymers having a desirable molecular weight and a high tacticity.

(b) Description of the Prior Art

Syndiotactic polypropylene has been known for a long period of time. However, such polypropylene prepared by polymerization at a low temperature in the presence of a conventional catalyst comprising a vanadium compound, an ether and an organic aluminum compound was poor in syndiotacticity. Therefore, it was scarcely considered to have characteristic properties as syndiotactic polypropylene.

A polypropylene having a good syndiotacticity, i.e., a syndiotactic pentad fraction (rrrr) of more than 0.7 in accordance with $^{13}$C-NMR has been discovered for the first time by J. A. Ewen et al. which can be obtained by polymerizing propylene by the use of a polymerization catalyst comprising a transition metal (Hf or Zr) compound having asymmetric ligands and methylaluminoxane (J. Amer. Chem. Soc., Vol. 110, p. 6255-6256, 1988).

According to the above-mentioned J. A. Ewen et al. method, the above-mentioned catalyst has good activity per transition metal, and syndiotactic polypropylene having a good syndiotacticity can be obtained. In addition, when propylene is copolymerized with another olefin in accordance with the above-mentioned method, a propylene-olefin copolymer having a substantially syndiotactic structure can be obtained.

In the aforesaid polymerization or copolymerization, the molecular weight of the obtained polymer or copolymer depends upon a polymerization temperature. However, there is the problem that the control of the molecular weight cannot be achieved sufficiently by hydrogen which is used for molecular weight control in manufacturing the polypropylene or propylene copolymer by the use of a conventional Ziegler catalyst.

SUMMARY OF THE INVENTION

An object of the present invention is to provide a method for preparing polypropylene and propylene copolymers having a desirable molecular weight and a high syndiotacticity.

Other objects of the present invention will be elucidated from the description given hereinafter.

According to the present invention, there can be provided the following method for preparing a syndiotactic (co)polymer of propylene:

A method for preparing a syndiotactic (co)polymer of propylene which comprises the step of (co)polymerizing propylene or propylene and a small amount of another olefin in the presence of a transition metal compound having asymmetric ligands and in the presence of at least one of the internal olefins represented by the formulae (I) and (II)

$$R^1—CH=CH—R^2 \quad (I)$$

(wherein each of $R^1$ and $R^2$ is independently an alkyl group having 1 to 17 carbon atoms, or $R^1$ and $R^2$ may form a cyclic monoolefin having 5 to 22 carbon atoms together with —C=C—), and

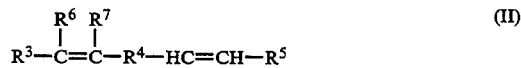

$$\underset{R^3—C=C—R^4—HC=CH—R^5}{\overset{R^6\ R^7}{|\ \ |}} \quad (II)$$

(wherein each of $R^3$ and $R^5$ is independently an alkyl group having 1 to 14 carbon atoms, each of $R^6$ and $R^7$ is independently a hydrogen atom or an alkyl group having 1 to 14 carbon atoms, and $R^4$ is an alkylene group having 1 to 14 carbon atoms).

DESCRIPTION OF THE PREFERRED EMBODIMENTS

In the present invention, propylene alone or propylene and ethylene or an α-olefin having 4 to 20 carbon atoms preferably in an amount of 20% by weight or less based on the weight of propylene are (co)polymerized in the presence of an internal olefin of the abovementioned formula (I) or (II) by the use of a transition metal compound catalyst having asymmetric ligands.

Examples of the above-mentioned α-olefins having 4 to 20 carbon atoms include straight-chain α-olefins such as butene-1, pentene-1, hexene-1, heptene-1, octene-1, nonene-1, decene-1, undecene-1, dodecene-1, tridecene-1, tetradecene-1, pentadecene-1, hexadecene-1 and octadecene-1, and branched α-olefins such as 3-methylbutene-1, 4-methylpentene-1 and 4,4-dimethylpentene-1.

By changing the amount of ethylene or the α-olefin of 4 to 20 carbon atoms within the above-mentioned range, a propylene-olefin copolymer having desirable physical properties can be obtained.

The internal olefins which can be used in the present invention are represented by the formulae (I) and (II)

$$R^1—CH=CH—R^2 \quad (I)$$

(wherein each of $R^1$ and $R^2$ is independently an alkyl group having 1 to 17 carbon atoms, or $R^1$ and $R^2$ may form a cyclic monoolefin having 5 to 22 carbon atoms together with —C=C—), and

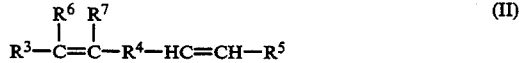

$$\underset{R^3—C=C—R^4—HC=CH—R^5}{\overset{R^6\ R^7}{|\ \ |}} \quad (II)$$

(wherein each of $R^3$ and $R^5$ is independently an alkyl group having 1 to 14 carbon atoms, each of $R^6$ and $R^7$ is independently a hydrogen atom or an alkyl group having 1 to 14 carbon atoms, and $R^4$ is an alkylene group having 1 to 14 carbon atoms).

These internal olefins preferably have 4 to 20 carbon atoms in all (7 to 20 carbon atoms in the case of diolefins).

Typical examples of the internal olefins include 2-butene, 2-pentene, 2-hexene, 2-heptene, 2-octene, 2-decene, 2-hexadecene, cyclopentene, cyclohexene, cycloheptene, cyclooctene, cyclic olefins and polycyclic monoolefins such as norbornene and 5,6-dimethyl-2-norbornene, trichloro[5.2.1.0$^{2,6}$]dec-8-ene, 9,10-dihydrodicyclopentadiene, tetracyclo[$6.2.1.1^{3,6}.0^{2,7}$]-dodec-4-ene, hexacyclo[$6.6.1.1^{3,6}.1^{10,13}.0^{2,7}.0^{9,14}$]-heptadec-4-ene having a crosslinking structure and non-conjugated dienes of the formula (II) such as 2,5-pentadiene, 2,5-octadiene, 2,6-octadiene, 3-methyl-2,6-octadiene and 2-methyl-2,6-octadiene.

In particular, 2-butene, 2-pentene, 2-hexene, cyclopentene, cyclohexene, cycloheptene and norbornene can be preferably used.

The amount of the internal olefin depends upon the desirable molecular weight of the product, but it can be suitably selected from the range of from 0.001 to 10% by weight based on the weight of the monomer to be (co)polymerized.

Examples of the transition metal compound having asymmetric ligands include compounds disclosed in the above-mentioned J. A. Ewen et al.'s literature and compounds represented by the formula

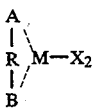

(wherein A and B are cyclic unsaturated hydrocarbons which are different from each other, R is a hydrocarbon residue having 1 to 20 carbon atoms or a group containing silicon for linking A with B, X is a halogen atom or a hydrocarbon residue having 1 to 20 carbon atoms, and M is a metal atom selected from the group consisting of titanium, zirconium and hafnium).

Examples of A and B in the above formula include monocyclic and polycyclic unsaturated compounds having 5 to 30 carbon atoms. Typical examples of A and B include cyclopentadiene, its derivatives in which a part or all of the hydrogen atoms are substituted by alkyl groups having 1 to 10 carbon atoms (the terminal of each alkyl group may also be bonded to the cyclopentadiene ring), polycyclic aromatic compounds such as indene and fluorene, and derivatives thereof in which a part or all of the hydrogen atoms are substituted by alkyl groups having 1 to 10 carbon atoms.

Preferable examples of R in the above-mentioned formula include a dialkylmethylene group and a dialkylsilylene group, and for example, compounds having $R'_2C<$ and $R'_2Si<$ (wherein R's may be identical or different, and each of them is hydrogen or an alkyl residue having 1 to 20 carbon atoms) can be preferably utilized. In addition, an ethylene group represented by $-CR'_2-CR'_2-$ can also be exemplified (wherein R' is defined as in the above formula).

Examples of X in the above-mentioned formula include fluorine, chlorine, bromine, iodine, alkyl groups such as methyl, ethyl, propyl and butyl, and an aromatic compound such as a cyclopentadienyl group. In particular, chlorine and a methyl group are preferable.

In the (co)polymerization, it is preferred that the aluminoxane is used together, and examples of the aluminoxane include compounds represented by the formulae

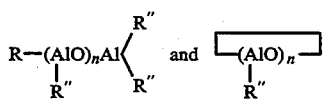

(wherein R'' is a hydrocarbon residue having 1 to 3 carbon atoms, and n is an integer of 1–50). In particular, what is suitably used is the aluminoxane in which R'' is a methyl group and n is 5 or more, preferably 10 or more.

The amount of the aluminoxane to be used is from 10 to 1,000,000 mole times, usually from 50 to 5,000 mole times as much as that of the above-mentioned transition metal catalyst.

The transition metal compound in which X in the above-mentioned formula is an alkyl group can be used, and the aluminoxane can be replaced with an anion such as a quaternary boron compound, for example, a tetraphenylboron or a substituted tetraphenylboron (see EP 277003, EP 277004 and the like).

In the present invention, no particular restriction is put on polymerization conditions, and various polymerization techniques are utilizable such as solvent polymerization using an inert solvent, bulk polymerization in which there is substantially no inert solvent, and gas phase polymerization. Usually, the polymerization temperature is from $-100°$ to 200° C. and the polymerization pressure is from atmospheric pressure to 100 kg/cm²-G (gauge). Preferably the temperature is from $-100°$ to 100° C. and the pressure is from atmospheric pressure to 50 kg/cm2-G.

When propylene alone is polymerized or propylene and another olefin are copolymerized by the use of the above-mentioned polymerization catalyst under the above-mentioned polymerization conditions, polypropylene having a syndiotactic pentad fraction of 0.7 or more or a propylene copolymer in which in its $^{13}$C-NMR absorption spectrum measured in a 1,2,4-trichlorobenzene solution on the basis of tetramethylsilane, a peak intensity observed at about 20.2 ppm is 0.3 or more of the total peak intensity attributed to the methyl groups of propylene.

In order to further improve the syndiotacticity fraction of the (co)polymer, it is effective to wash the (co)polymer with a hydrocarbon solvent having 3 to 20 carbon atoms. Examples of the utilizable hydrocarbon solvent include propylene itself, saturated hydrocarbon compounds such as propane, butane, pentane, hexane, heptane, octane, nonane and decane, aromatic hydrocarbon compounds such as benzene, toluene, xylene and ethylbenzene, and these hydrocarbons in which a part or all of the hydrogen atoms are replaced with fluorine, chlorine, bromine or iodine. Other usable solvents include alcohols having 1 to 20 carbon atoms, and ethers and esters having 2 to 20 carbon atoms which can dissolve or disperse a lower-molecular atactic component therein. No particular restriction is put on a washing manner, and the washing can usually be carried out at a temperature of from 0° C. to 100° C.

The employment of a high-purity catalyst usually having a purity of 90% or more and a relatively low temperature of usually 100° C. or less is also effective to obtain the (co)polymer having the high syndiotacticity.

In the present invention, the preferably molecular weight of the propylene (co)polymer having the substantially syndiotactic structure is such that its intrinsic viscosity measured in a tetralin solution at 135° C. is from 0.1 to 10, preferably from 0.5 to 5.0. Furthermore, a ratio Mw/Mn of the weight average molecular weight (Mw) to the number average molecular weight (Mn) of the (co)polymer measured in 1,2,4-trichlorobenzene solution at 135° C. by a gel permeation chromatography is preferably from 1.5 to 15.

The present invention will be described in more detail in reference to examples and comparative examples. However, it should not be construed that these examples limit the present invention.

EXAMPLE 1

2.5 mg of isopropyl(cyclopentadienyl-1-fluorenyl)zirconium dichloride, 0.34 g of methylaluminoxane (polymerization degree 16.1) made by Toso Akzo Co., Ltd and 3 ml of norbornene were added to 1 liter of toluene in a 2-liter autoclave. This isopropyl(cyclopentadienyl-1-fluorenyl)zirconium dichloride was obtained by converting, into a lithium salt, isopropylcyclopentadienyl-1-fluorene synthesized in an ordinary manner, reacting the same with zirconium tetrachloride, and then recrystallizing the resultant reaction product. Afterward, propylene was polymerized at 20° C. under a polymerization pressure of 3 kg/cm²-G for 2 hours. Methanol and methyl acetoacetate were then added to the resultant polymer, and the solution was then treated at 30° C., washed with an aqueous hydrochloric acid solution, and then filtered to obtain 105 g of syndiotactic polypropylene.

According to $^{13}$C-NMR, the syndiotactic pentad fraction of this polypropylene was 0,904, and an intrinsic viscosity (hereinafter referred to as "$\eta$") measured in a tetralin solution at 135° C. was 0.72. Furthermore, Mw/Mn measured in a 1,2,4-trichlorobenzene solution was 2.2.

Comparative Example 1

The same procedure as in Example 1 was effected except that the polymerization was carried out without using norbornene, thereby obtaining 120 g of polypropylene. The syndiotactic pentad fraction of this polymer was 0.925, $\eta$ was 1.39, and Mw/Mn measured in a 1,2,4-trichlorobenzene solution was 2.3.

EXAMPLE 2

The same procedure as in Example 1 was effected except that the polymerization was carried out using 20 ml of cyclopentene in place of norbornene, thereby obtaining 98 g of a polymer. The syndiotactic pentad fraction of this polymer was 0.910, $\eta$ was 1.18, and Mw/Mn measured in a 1,2,4-trichlorobenzene solution was 2.1.

EXAMPLE 3

The same procedure as in Example 1 was effected except that the polymerization was carried out in the presence of a transition metal catalyst synthesized by substituting hafnium tetrachloride for zirconium tetrachloride, thereby obtaining 14 g of a polymer. The syndiotactic pentad fraction of this polymer was 0.875, $\eta$ was 3.25, and Mw/Mn measured in a 1,2,4-trichlorobenzene solution was 4.8.

Comparative Example 2

The same procedure as in Example 3 was effected except that the polymerization was carried out without using norbornene, thereby obtaining 15 g of a polymer. The syndiotactic pentad fraction of this polymer was 0,877, $\eta$ was 6.65, and Mw/Mn measured in a 1,2,4-trichlorobenzene solution was 4.5.

EXAMPLE 4

The same procedure as in Example 3 was effected except that norbornene was replaced with 50 ml of cyclohexene, thereby obtaining 12 g of a polymer. The syndiotactic pentad fraction of this polymer was 0,861, $\eta$ was 2.59, and Mw/Mn measured in a 1,2,4-trichlorobenzene solution was 4.7.

Comparative Example 3

The same procedure as in Comparative Example 2 was effected except that 1 l (at 0° C. and 1 atm.) of hydrogen was used, and in this case, only 1.2 g of a polymer was obtained. The syndiotactic pentad fraction of this polymer was 0,730, $\eta$ was 6.48, so that the molecular weight could not be controlled and the activity of the catalyst only deteriorated.

EXAMPLE 5

The same procedure as in Example 1 was effected except that the copolymerization was carried out by placing propylene in the autoclave 30° C. until a pressure of 2 kg/cm²-G was reached, adding ethylene for 1 minute at 1.0 g/minute every 10 minutes, and further adding propylene so that a polymerization pressure might be 2 kg/cm²-G, thereby obtaining 27 g of a propylene-ethylene copolymer. In the $^{13}$C-NMR absorption spectrum of this copolymer, the peak intensity observed at about 20.2 ppm is 0.89 of the total peak intensity attributed to the methyl groups of propylene, $\eta$ was 0.65, and Mw/Mn measured in a 1,2,4-trichlorobenzene solution was 2.3.

Comparative Example 4

The same procedure as in Example 5 was effected except that norbornene was not used, thereby obtaining 32 g of a propylene-ethylene copolymer. In the $^{13}$C-NMR absorption spectrum of this copolymer, the peak intensity observed at about 20.2 ppm is 0.89 of the total peak intensity attributed to the methyl groups of propylene, $\eta$ was 1.26, and Mw/Mn measured in a 1,2,4-trichlorobenzene solution was 2.2.

What is claimed is:

1. A method for controlling the molecular weight of a syndiotactic propylene homopolymer having a syndiotactic pentad faction of 0.7 or more, or of a syndiotactic copolymer of propylene and a small amount of another alpha-olefin in which copolymer a peak intensity observed at about 20.2 ppm by $^{13}$C-NMR absorption spectrum measured in a 1,2,4-trichlorobenzene solution on the basis of tetramethylsilane is 0.3 or more of a peaK intensity attributed to the methyl groups of propylene, which method comprises:

polymerizing propylene or propylene and a small amount of another alpha-olefin in the presence of a catalyst system comprising:

a catalyst comprising: (a) a transition metal compound having asymmetric ligands and represented by the formula

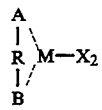

(wherein A and B are cyclic unsaturated hydrocarbon groups which are different from each other, R is a hydrocarbon residue having 1 to 20 carbon atoms or a group containing silicon for linking A with B, X is a halogen atom or a hydrocarbon residue having 1 to 20 carbon atoms, and M is a metal atom selected from the group consisting of titanium, zirconium and hafnium) and (b) an aluminoxane; or (a) a transition metal compound having asymmetric ligands and represented by the formula

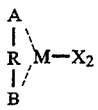

(wherein A and B are cyclic unsaturated hydrocarbon groups which are different from each other, R is a hydrocarbon residue having 1 to 20 carbon atoms or a group containing silicon for linking A with B, X is an alkyl group, and M is a metal atom selected from the group consisting of titanium, zirconium and hafnium) and (b) a quaternary boron compound; and
at least one cyclic monoolefin of the formula (I)

$$R^1-CH=CH-R^2 \qquad (I)$$

(wherein $R^1$ and $R^2$ form a cyclic monoolefin having 5 to 22 carbon atoms together with —C=C—) in an amount of from 0.001 to 10% by weight based on the weight of the monomer(s); thereby obtaining a syndiotactic propylene homopolymer or a syndiotactic propylene compolymer, wherein the syndiotactic pentad fraction of the homopolymer or the ratio of peak intensity observed at 20.2 ppm to total peak intensity attributed to the methyl groups of propylene of the copolymer is in the range of from 0.861 to 0.910 and wherein the molecular weight of said syndiotactic propylene homopolymer or said syndiotactic propylene copolymer in terms of intrinsic viscosity measured in a tetralin solution at 135° C. is in a range of from 0.39 to 0.85 times in intrinsic viscosity of a comparative polymer produced by polymerizing said propylene or propylene and a small amount of another alpha-olefin in the presence of said catalyst system and in the absence of said at least one cyclic monoolefin.

2. The method according to claim 1 wherein said cyclic monoolefin is cyclopentene, cyclohexene, cycloheptene or norbornene.

3. The method according to claim 1 wherein said polymerization is carried out at a temperature of from −100° C. to 200° C. under a pressure of from atmospheric pressure to a gauge pressure of 100 kg/cm².

4. The method according to claim 1 wherein said quaternary boron compound is a tetraphenylboron or a substituted tetraphenylboron.

5. The method according to claim 1 wherein said aluminoxane is a compound represented by the formula

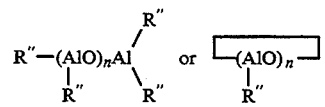

wherein R" is a hydrocarbon residue having 1 to 3 carbon atoms and n is an integer of 1 to 50.

6. The method according to claim 1 wherein said catalyst contains the aluminoxane in an amount of from 50 to 5,000 mole times the amount of the transition metal compound.

7. The method according to claim 1 wherein the catalyst comprises isopropyl(cyclopentadienyl-1-fluorenyl)zirconium dichloride and methylaluminoxane.

* * * * *

UNITED STATES PATENT AND TRADEMARK OFFICE
CERTIFICATE OF CORRECTION

PATENT NO. : 5,428,121

DATED: : June 27, 1995

INVENTOR(S) : Asanuma et al

It is certified that error appears in the above-identified patent and that said Letters Patent is hereby corrected as shown below:

IN THE CLAIMS:

In claim 1, Column 6, line 47, amend "peaK" to --peak--;

column 7, line 30, amend "compolymer" to --copolymer--; and column 8, line 2, amend "in" to --the--.

Signed and Sealed this

Fifth Day of December, 1995

Attest:

BRUCE LEHMAN

*Attesting Officer*  Commissioner of Patents and Trademarks